May 29, 1956 — P. A. THOMPSON — 2,747,975
COMBINATION CATALYST SCREEN SUPPORT AND COVER
Filed June 17, 1953
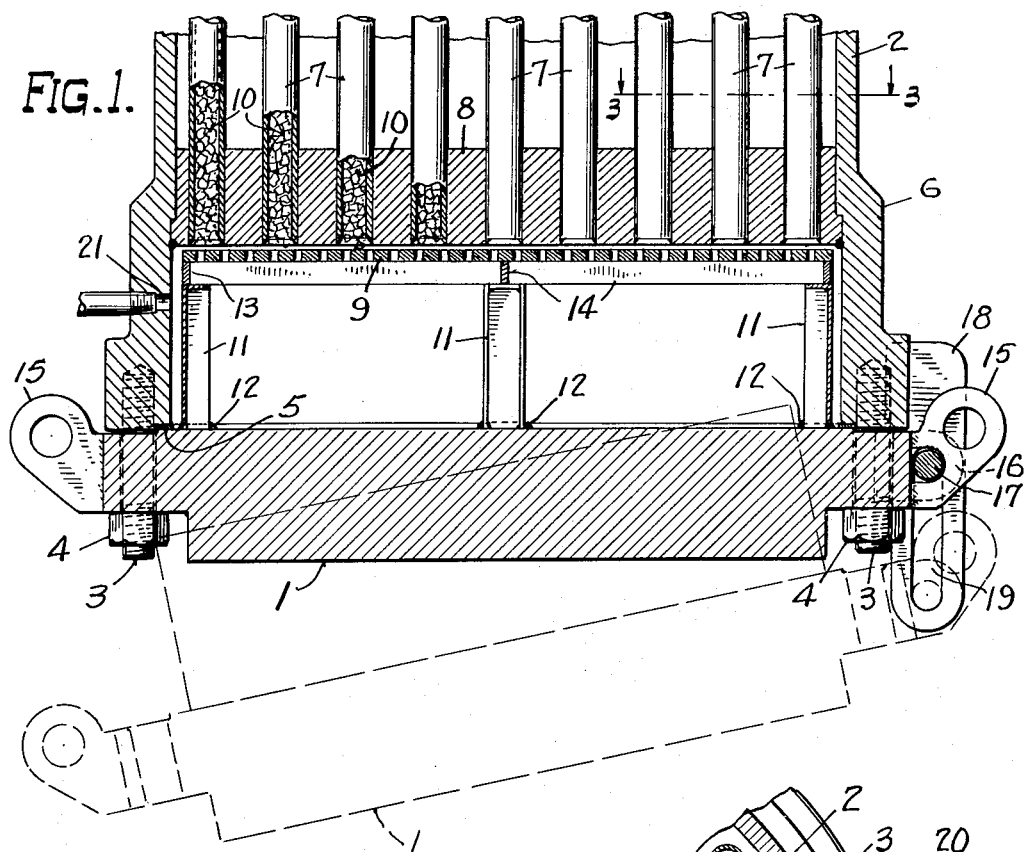
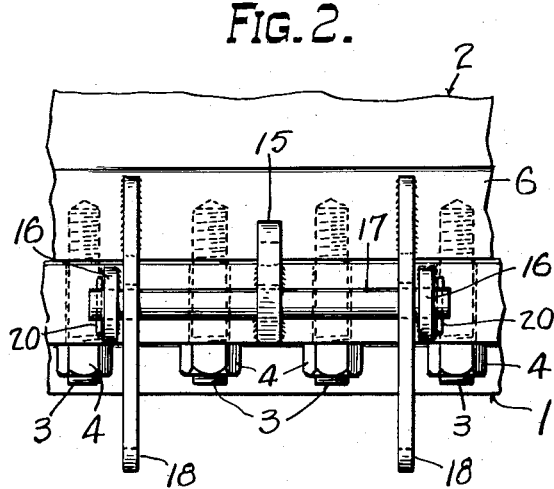
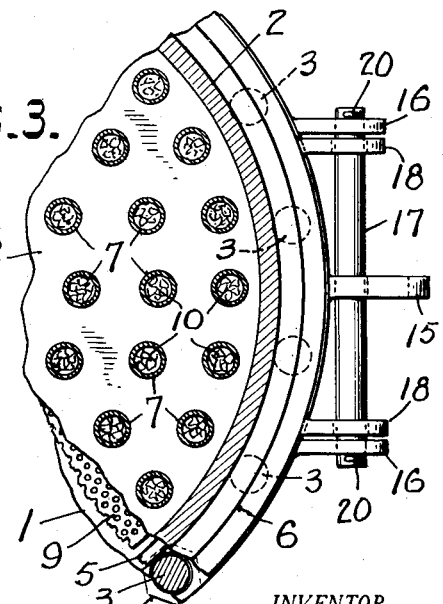
INVENTOR.
Phillip A. Thompson
BY Andrus & Sceales
ATTORNEYS.

United States Patent Office 2,747,975
Patented May 29, 1956

2,747,975

COMBINATION CATALYST SCREEN SUPPORT AND COVER

Phillip A. Thompson, Milwaukee, Wis., assignor to A. O. Smith Corporation, Milwaukee, Wis., a corporation of New York Application June 17, 1953, Serial No. 362,289

3 Claims. (Cl. 23—288)

This invention relates to a cover and screen support for a tubular catalyst reactor.

An object of the invention is to provide a cover and screen support for the bottom of a catalyst reactor in order that they may be assembled and disassembled to the reactor as a unit.

Another object of the invention is to provide a cover and screen support with improved means for removal of the loose catalyst when the unit is disassembled.

Another object of the invention is to provide a cover and screen support unit which is easily assembled to and disassembled from the reactor.

A further object of the invention is to provide a cover with an improved means of supporting the catalyst screen.

A further object of the invention is to provide a combination hinged cover and screen support for the bottom of a reactor to increase the efficiency in maintaining the reactor.

In general, the invention is directed to a bottom cover for a reactor which is provided with a sliding hinge means to allow the lowering and then tipping of the cover. The cover carries suitable support means on its inner face to support the catalyst screen adjacent the catalyst tubes.

In the drawing:

Figure 1 is a cross-sectional medial view of the lower portion of a reactor to illustrate the bottom cover and screen support;

Fig. 2 is a fragmentary elevational view of the closure showing the hinge; and

Fig. 3 is a fragmentary sectional view taken on line 3—3 of Figure 1.

Referring to the drawing, there is illustrated a bottom cover 1 assembled to the bottom of a tubular catalyst reactor 2 by the stud bolts 3 and nuts 4. A sealing gasket 5 is disposed between the cover 1 and the shell 6 of the reactor to insure a tight seal between the cover and the shell.

The catalyst reactor is illustrated as comprising a tubular shell 6 with a plurality of catalyst tubes 7 secured therein by the tube plate 8. The tubes 7 are positioned such that their lower ends preferably lie in a horizontal plane within the tubular shell 6.

A screen 9 immediately adjacent the ends of the tubes 7 support the catalyst 10 within the tubes 7. The screen is constructed such as to retain substantially all of the catalyst 10 within the tubes 7 and still allow free passage of a gas therethrough.

The cover 1 carries support members 11 secured thereto as by welds 12. The support members are preferably positioned on the cover to form a circle spaced from the shell 6 a predetermined distance as hereinafter explained. A circular support bar 13 is welded or otherwise secured on the top of support members 11. The screen 9 is securely attached to the circular support bar 13 in any desired manner, for example, spot welding. Although the bar 13 is not absolutely essential, it is preferably employed in that the screen 9 is then strongly supported around its entire circumference.

Horizontal bar stiffeners 14 are perferably welded or otherwise secured to the support members 11 to span the circle formed, with the upper edge of the horizontal bars 14 lying in the same plane as the upper surface of the circular bar 13. The horizontal bars 14 hold the screen adjacent the tubes 7 and prevent sagging of the screen at its center. Although any desired number of horizontal bars 14 may be employed for purposes of illustration, two such bars are shown at right angles to each other.

With the above described cover and screen support, the screen 9 moves with the cover in assembly and disassembly of the cover 1 from the shell, as hereinafter described.

The cover is circularly recessed at its exterior edge to permit a thick cover plate with a reduced thickness through which the stud bolts 3 pass. In this manner, a high pressure cover plate is employed which may be dropped with the face of the screen still within the channel and then tipped to allow for the removal of loose catalyst. After the loose catalyst has been removed, the cover is swung clear of the reactor bottom and permits access to the inside of the tubular reactor.

The cover 1 is raised and lowered with respect to the shell 6 by suitable means such as a pair of chains, not shown, on the diametrically opposite sides of the shell 6 and cover 1.

The chains or other raising and lowering means for the cover are connected to suitable lifting means such as center lifting lugs 15.

A pair of auxiliary lifting lugs 16 are welded or otherwise secured to the cover on opposite sides of one center lug 15, shown for purposes of illustration as the lug 15 to the right in Figure 1. A pin 17 passes through aligned openings in the lugs 15 and 16.

Vertical guide members 18 are welded or otherwise secured to the shell 6 adjacent the auxiliary lugs 16. Each guide member 18 is provided with a vertical slot 19 within which the pin 17 moves vertically as the cover 1 is assembled and disassembled, as hereinafter described.

The vertical slot 19 in guide members 18 is preferably such that the pin 17 meets the upper edge of the vertical slot 19 when the cover is secured to the shell and the pin 17 rests in the lower end of the vertical slot 19 when the cover is lowered and ready to be tipped. Further, the vertical slot 19 is such that when the cover is lowered the cover is disposed below the tightening bolts and may be tipped. Cotter pins 20 in each end of the pin 17 insure the retention of the pin in place.

An outlet 21 in the shell 6, adjacent the space between the screen 9 and cover 1, permits the gas passing downwardly through the tubes 7 to flow to a suitable receptacle, not shown.

The operation of the assembling and disassembling of the cover and screen support is as follows:

Assume the cover and screen are to be removed in order to replace the catalyst in the tubes.

The cover 1 is detached from the tubular reactor by removing the nuts 4 from the stud bolts 3 after which the cover is lowered until the cover is clear of the bolt 3.

The side of the cover, shown to the left in Figure 1, is then lowered and the cover tips, as shown by a dotted outline of the cover and screen in Figure 1, to permit the flow of any loose catalyst off the screen into any suitable receiving receptacle, not shown.

After the loose catalyst has been removed the cover is allowed to swing downwardly and clear of the bottom opening in order to allow access to the inside of the tubular reactor.

When the screen is to be replaced into position, the cover 1 is raised to a horizontal position with the screen within the reactor. The cover is then lifted into position by the chains and secured to the reactor by securely threading the nuts 4 onto the bolts 3.

The invention provides in a reactor an integral screen and cover which unit can be readily assembled and disassembled for cleaning and repair purposes.

Various embodiments of the invention may be employed within the scope of the following claims.

I claim:

1. In a cover and screen unit for a reactor having a plurality of tubes, a screen disposed immediately beneath the reactor tubes to support a catalyst within the tubes, a cover plate provided at the lower end of the reactor beneath said tubes, means on said cover free of said reactor to effect raising and lowering of said cover, means secured to said cover plate and to said screen to secure said screen to the cover and hold the screen in position beneath the tubes within said reactor and substantially removed from said cover at a position requiring lowering of the screen to permit pivoting of the screen from within the reactor, and vertically sliding pivotal hinge means connecting said cover plate and reactor to effect lowering of said cover plate and screen and then tipping to permit the flow of loose catalyst off of the screen without complete disassembly of the cover plate and screen from the reactor.

2. In combination in a reactor having a plurality of tubes, a screen supported immediately adjacent said tubes and supporting a catalyst within the tubes with said screen projecting upwardly into said reactor to a position requiring lowering of the screen to permit pivoting of the screen from within the reactor, a cover plate disposed at the lower end of the reactor beneath said screen and adapted to be tightly secured to said reactor to seal the reactor, rigid support members secured to said cover and said screen to hold the screen in position in spaced relation with said cover, lifting and lowering lugs attached to said cover for engagement by power means to move the cover vertically, and vertically movable hinge means connecting the cover to said reactor to effect tipping of the cover and removal of loose catalyst from said screen when the screen is lowered, said arrangement permitting the removal of old catalyst and replenishing of new catalyst without complete disassembly of the cover plate and screen from the reactor.

3. A combination for a tubular reactor having a plurality of tubular members within which a catalyst is held, which comprises a screen disposed immediately adjacent the tubular members to support the catalyst and to allow the passage of a gas therethrough, a cover plate adapted to be secured to the reactor by circumferentially spaced stud bolts from the reactor passing through said cover and nuts tightened thereon, support means secured to said cover and said screen to support said screen in spaced relation to said cover with said screen projecting upwardly into the reactor to a position requiring lowering of the screen to permit pivoting of the screen from within the reactor, and said cover having an annular recess on its exterior surface to reduce the thickness of the cover and permit employment of said stud bolts, means to lower said cover clear of said stud bolts, and a sliding hinge comprising a vertically slotted member connected to the reactor and a pin riding in the slotted member and pivoted to said cover, said hinge connecting said cover and said reactor to permit lowering of said cover and said screen as a unit to clear the screen of the reactor and then tipping to allow removal of loose catalyst on the screen when replacing the catalyst in the tubular members, said arrangement permitting the assembly and disassembly of the cover and screen for the tubular reactor as an integral unit rather than separately when replacing the catalyst within the tubular members.

References Cited in the file of this patent

UNITED STATES PATENTS

| | | |
|---|---|---|
| 1,729,581 | Hodge | Sept. 24, 1929 |
| 1,836,166 | Hechenbleikner et al. | Dec. 15, 1931 |
| 2,596,354 | Zollinger | May 13, 1952 |
| 2,601,566 | Soderquist | June 24, 1952 |